United States Patent [19]

Priebe

[11] Patent Number: 4,635,611

[45] Date of Patent: Jan. 13, 1987

[54] ARCHERY QUIVER

[76] Inventor: Raymond G. Priebe, P.O. Box 691, Grayling, Mich. 49738

[21] Appl. No.: 745,528

[22] Filed: Jun. 17, 1985

[51] Int. Cl.$^4$ .............................................. F41B 5/06
[52] U.S. Cl. .................................. 124/24 A; 124/88; 24/585; 403/381
[58] Field of Search ................... 124/23 A, 24 A, 41, 124/45, 86, 88, 23 R, 24 R; 403/381, 407.1, 331; 24/584, 585, 647, 170; 292/238

[56] References Cited

U.S. PATENT DOCUMENTS

| | | | |
|---|---|---|---|
| 438,675 | 10/1890 | Beardsley | 292/238 |
| 3,608,158 | 3/1969 | Bengtsson | 24/170 |
| 3,777,734 | 12/1973 | Rose | 124/24 A |
| 4,156,496 | 5/1979 | Stinson | 124/23 A |
| 4,564,732 | 1/1986 | Lancaster et al. | 403/381 |

*Primary Examiner*—Richard C. Pinkham
*Assistant Examiner*—Gary Jackson

*Attorney, Agent, or Firm*—Gifford, Groh, VanOphem, Sheridan, Sprinkle & Dolgorukov

[57] ABSTRACT

The present invention provides an archery quiver which is detachably secured to an archery bow. A mounting plate is secured to the archery bow and includes an elongated projection having two sides which taper towards each other from one end to the other end of the projection. The quiver, furthermore, includes a channel open at at least one end and which conforms in shape to the projection and so that the projection is slidably received through the open end of the channel to a predetermined positon within the channel. A cam lock is pivotally mounted on the quiver and movable between a locked and unlocked position. In its locked position, a cam surface on the cam member abuts against the mounting plate and secures the mounting plate and quiver together. Conversely, in its unlocked position, the cam surface disengages from the mounting plate and permits the quiver to be slid away from the mounting plate, and thus from the bow, when desired.

6 Claims, 6 Drawing Figures

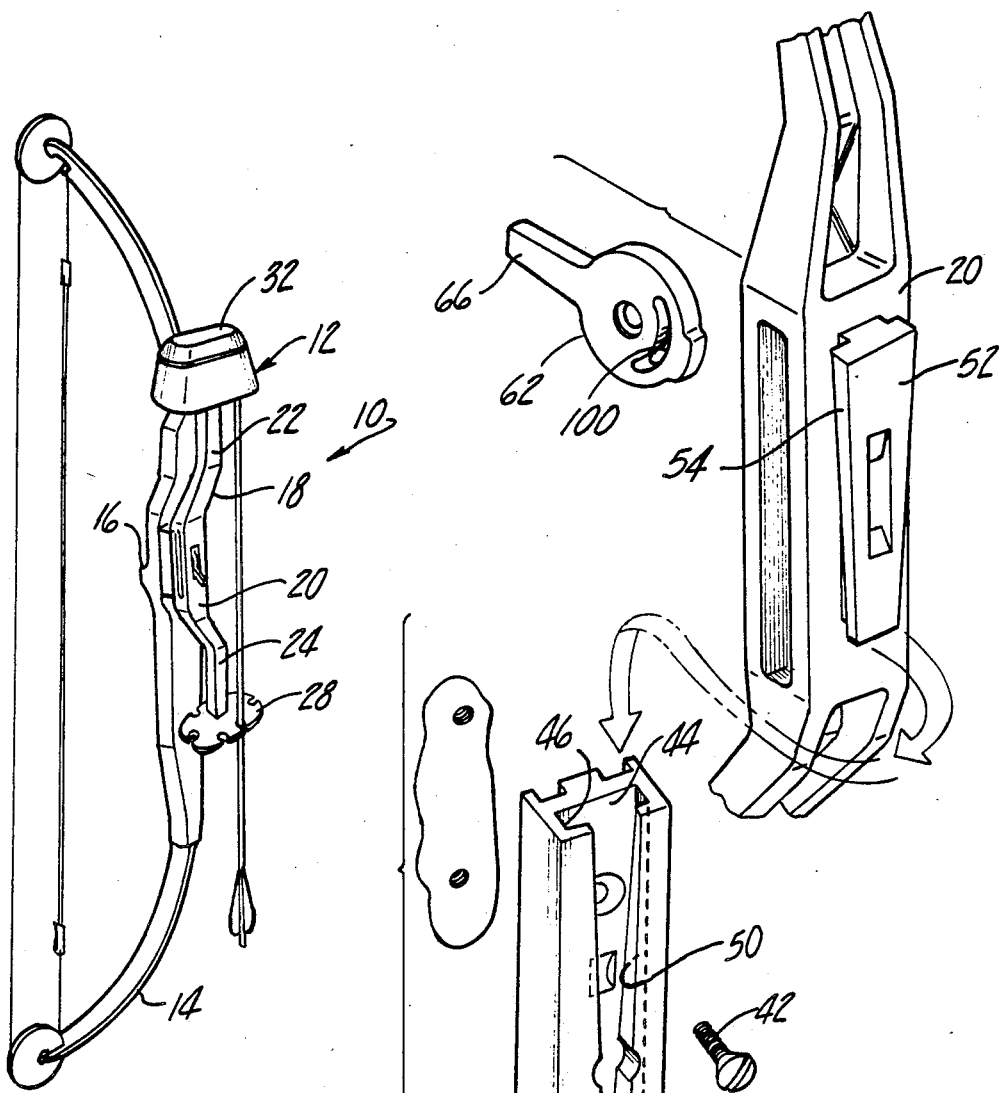
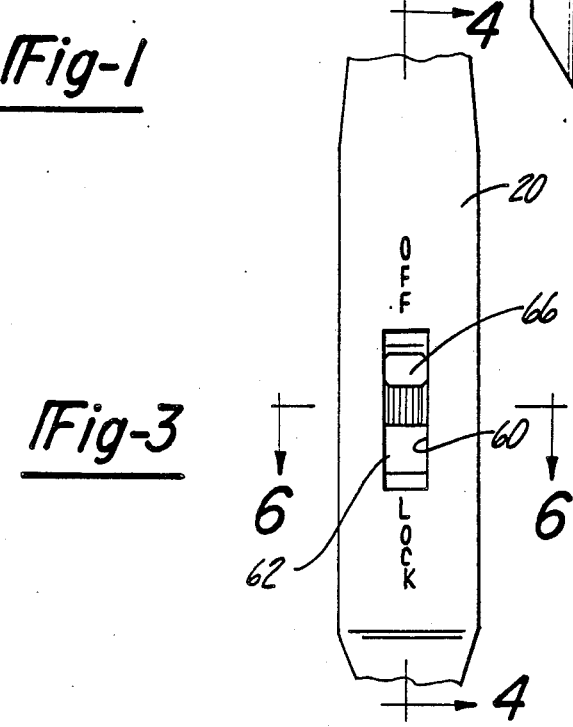
Fig-1
Fig-2
Fig-3

ARCHERY QUIVER

BACKGROUND OF THE INVENTION

I. Field of the Invention

The present invention relates to an archery quiver which is detachably mounted to an archery bow.

II. Description of the Prior Art

In the sport of archery, both for hunting and for target shooting, it is convenient to have a quantity of arrows readily available to the archer for fast reloading. For this reason, there have been a number of previously known quivers which are attached directly to the side of the bow opposite from the bow site window.

Many of these previously known quivers are attached to the bow by screws or bolts so that it is necessary to unbolt or unscrew the quiver when removal is desired. In many situations, however, it is highly desirable to remove the quiver from the bow temporarily, quickly and without the necessity for tools.

There are a number, however, of previously known bow mounted quivers in which the quiver is detachably secured to the bow. Examples of these types of previously known bow quivers are shown in U.S. Pat. No. 4,195,616 to Darlington which issued on Apr. 1, 1980 and U.S. Pat. No. 4,156,496 to Simpson which issued on May 29, 1979.

Many of these previously known detachable bow quivers, however, are only loosely attached to the bow and are prone to rattling. Furthermore, many of these previously known detachable bow quivers are prone to unintended accidental detachment from the bow, particularly when the quiver is bumped against an object.

SUMMARY OF THE PRESENT INVENTION

The present invention provides a detachable bow mounted quiver which overcomes all of the above mentioned disadvantages of the previously known devices.

In brief, the present invention comprises a mounting plate which is secured to the side of the bow opposite the site. In addition, the mounting plate includes an elongated projection with two sides which taper towards each other from one end to the other end of the projection. Similarly, a channel conforming in shape to the mounting plate projection is formed on the quiver and this channel is open at one end. The projection is slidably received within the channel until the tapered sides of the projection abut against the sides of the channel and limit the insertion of the projection into the channel to a predetermined position. The projection together with the channel form a bayonet mount.

In order to lock the quiver to the mounting plate, and thus to the bow, when the projection is slid into the channel, a cam lock is pivotally mounted to the quiver and pivotal between a locked and an unlocked position. In its locked position, a cam surface engages the mounting plate and secures the mounting plate and quiver together. Conversely, in its unlocked position, the cam surface disengages from the mounting plate and enables the projection to be freely slid out of its receiving channel. Preferably, the cam is pivoted between its locked and unlocked position by a small lever protruding outwardly from one side of the cam and through a slot in the quiver.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a perspective view illustrating a preferred embodiment of the invention secured to a bow;

FIG. 2 is an exploded view of a portion of the preferred embodiment;

FIG. 3 is a plan view of a portion of the preferred embodiment;

DETAILED DESCRIPTION OF A PREFERRED EMBODIMENT OF THE INVENTION

Figure 4:
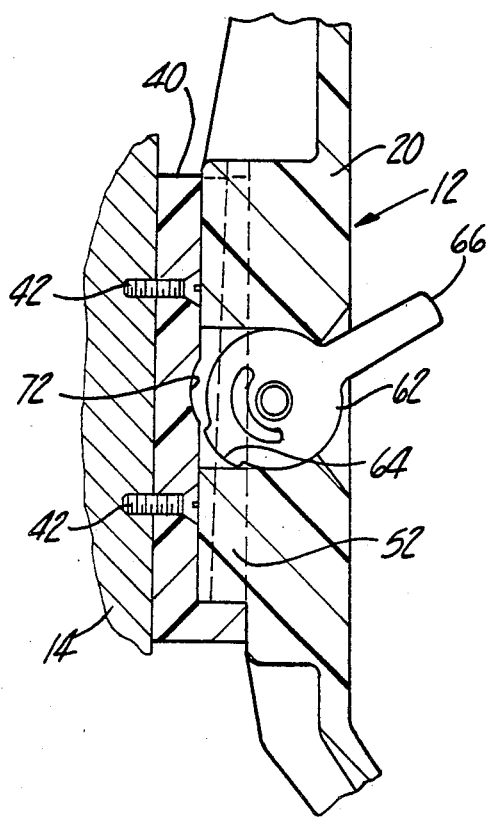
FIG. 4 is a cross sectional view taken along line 4—4 in FIG. 3.
Figure 5:
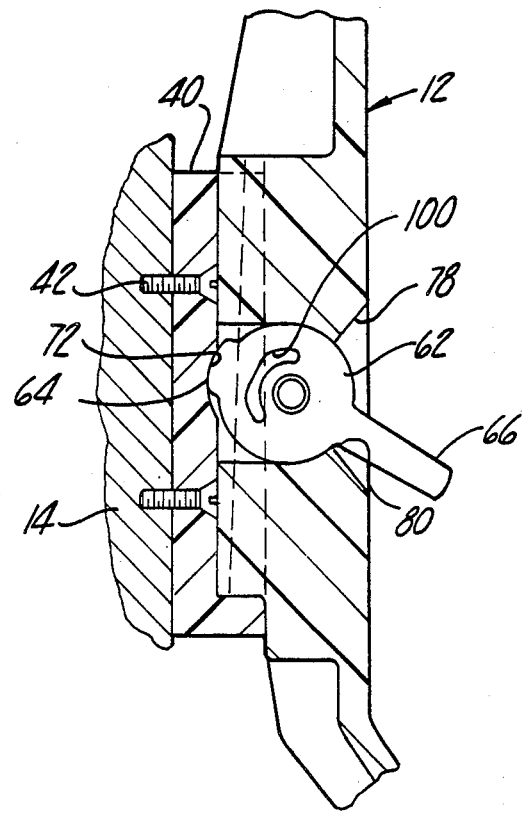
FIG. 5 is a view similar to FIG. 4.

With reference to FIG. 1, a preferred embodiment of the archery device 10 of the present invention is thereshown and comprises a quiver 12 which is detachably mounted to one side of a bow 14 in the fashion to be subsequently described in greater detail. The quiver 12, furthermore, is attached to the bow 14 on the side of the bow 14 opposite from the site window 16 for rapid and convenient access by the archer.

With reference still to FIG. 1 the quiver 12 comprises an elongated frame 18 having a central portion 20 and two end portions 22 and 24 which extend obliquely from opposite ends of the central portion 20 of the frame 18. Furthermore, the free ends of the frame end portions 22 and 24, respectively, are substantially aligned, but spaced apart, from each other.

A notched plate 28 is secured in any conventional fashion to the lower end 24 of the frame 18 while a cup 32 is similarly secured to the upper end portion 22 of the frame 18 so that an open end of the cup 32 faces the notched plate 28. In the conventional fashion, arrow tips are positioned within receiving apertures (not shown) in the cup 32 while the shafts of the arrows are positioned within notches in the notched plate 28 in order to retain the arrows in a spaced apart but substantially parallel relationship with respect to each other. Furthermore, the an arrow can be easily removed by pulling the arrow shaft from its receiving notch in the notched plate 28 and lifting the arrow point out of the cup 32. Preferably, the notched plate 28 is constructed of a resilient material and resiliently holds the arrow shafts.

The novelty of the present invention, however, resides in the means for detachably securing the quiver 12 to the bow 14. With reference then to FIGS. 2 and 4, the means for detachably securing the quiver 12 to the bow 14 comprises an elongated mounting plate 40 which is generally rectangular in cross sectional shape. The mounting plate 40 is secured to the bow 14 in any conventional fashion, such as by screws 42, so that the longtiudinal axis of the mounting plate 40 is generally aligned with the axis of the bow 14.

A longitudinally extending channel 44 is formed in the mounting plate 40 having an open end 46 at its top and a closed end 48 at its bottom. This channel 44 is generally T-shaped in cross section and, as best shown in FIG. 2, the sides 50 of the channel 44 taper toward each other from its open end 46 to its closed end 48.

With reference now to FIG. 2, an outwardly extending projection 52 is secured to, or integrally formed with, the central portion 20 of the quiver frame 18. This projection 52 conforms in shape to the channel 44 and, thus, is generally T-shaped in cross section and includes sides 54 which taper toward each other from the top to the bottom of the projection 52.

Since the projection 52 conforms in shape to the channel 44, the projection 52 is slidably received through the open end 46 of the channel 44 to the position shown in FIG. 4 in which the tapering sides 54 of the projection 52 frictionally engage the sides 50 of the channel 46 and limit the downward movement of the projection 52 into the channel 44. The projection 52 together with the channel 44 thus form a bayonet mount.

Figure 6:
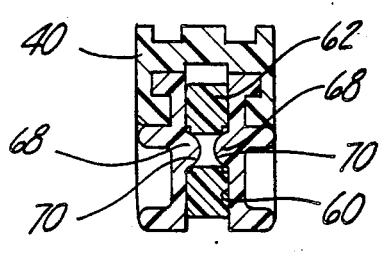
FIG. 6 is a cross sectional view taken along line 6—6 in FIG. 3.

With reference now to FIGS. 2-5, in order to lock the mounting plate 40 and quiver frame 18 together, the quiver frame 18 includes a through slot 60 which is generally rectangular in shape and extends substantially centrally through the projection 52. A disk 62 having a cam surface 64 along one edge and an outwardly protruding lever 66 at an opposed edge is then pivotally mounted within the slot 60 between a locked position (FIG. 5) and an unlocked position (FIG. 4). An arcuate through slot 100 is also formed through the disk 62 between the cam surface 64 and the center of the disk 62. Although the disc 62 can be pivotally mounted within the slot 60 by any conventional means, preferably two pivot bumps 68 (FIG. 6) in the slot 60 engage recesses 70 formed in opposite sides of the disk 62.

In its locked position (FIG. 5), the cam surface 64 of the disk 62 protrudes outwardly from the projection 52 and frictionally engages a recessed arcuate abutment surface 72 in the mounting plate 40. In doing so, the cam surface 64 locks the quiver 12 to the mounting plate 40 and, thus, to the bow 14. Simultaneously, through slot 100 allows the cam surface 64 to compress slightly inwardly towards the center of the disk 62 (FIG. 5) to thereby snugly attach the quiver 12 to the bow 14 and prevent rattling.

Conversely, in its unlocked position, the cam surface 64 disengages or retracts away from the abutment surface 72 on the mounting plate 40 thus allowing the projection 52, along with the quiver 12 to be slid away from the mouting plate 40 and thus detached from the bow 14.

With the disk 62 pivotally mounted to the quiver 12, the lever 66 protrudes outwardly from the side of the quiver frame central portion 20 opposite from the mounting plate 40 for easy access by the archer. Furthermore, the ends 78 and 80 (FIG. 5) of the slot 60 limit the pivotal action of the disk 62 by abuting against the lever 66 in both its locked and unlocked positions.

From the foregoing, it can be seen that the present invention provides a detachable bow mounted quiver 12 which is not only simple and inexpensive in construction, but wholly effective in use. In particular, due to the camming action of the disk 62, the disk 62 firmly secures the quiver frame 18 to the mounting plate 40 on the bow 14 and prevents rattling of the quiver 12 as well as unintentional detachment of the quiver 12 from the bow 14. However, the quiver 12 can be easily and rapidly detached from the bow 14 by simply switching the lever 66 on the disk 62 and thereafter sliding the quiver 12 out of the mounting plate channel 44.

Having described my invention, however, many modifications thereto will become apparent to those skilled in the art to which it pertains without deviation from the spirit of the invention as defined by the scope of the appended claims.

I claim:

1. An archery device for use with an archery bow comprising:
    a quiver,
    means for detachably securing said quiver to the bow, said securing means comprising,
    a mounting plate,
    means for securing said mounting plate to the bow,
    one of said bow or said mounting plate having a longitudinally elongated projection with two sides which taper toward each other from one end to the other end of said projection,
    the other of said bow or said mounting plate comprising a channel open at at least one end, said channel conforming in shape to said projection so that said projection is longitudinally slidably received through the open end of said channel to a predetermined position in said channel,
    and means for detachably locking said quiver to said mounting plate at said predetermined position
    wherein said locking means comprises a cam having an outwardly protruding cam surface and pivotally mounted to said quiver between a locked and an unlocked position, wherein in said locked position said cam surface is received within and engages a recessed abutment surface on said mounting plate, said cam and said recess extending in a direction transverse to the longitudinal axis of said projection so that said cam surface prevents longitudinal sliding of said projection in said channel and wherein in said unlocked position said cam surface disengages from said abutment surface,
    wherein said cam comprises a disc having a pivotal axis, said cam surface being formed on one peripheral edge of said disc, and a lever protruding outwardly from an edge of said disc substantially opposed to said cam surface, and
    wherein said disc comprises a through slot between said pivotal axis and said cam surface, said cam being dimensioned so that, with said cam in said locked position, said cam surface compresses against said recess and radially compresses said slot.

2. The invention as defined in claim 1 wherein said cam surface is arcuate and wherein said abutment surface is arcuate.

3. The invention as defined in claim 1 wherein said projection is formed on said mounting plate and wherein said channel is formed on said quiver.

4. The invention as defined in claim 1 wherein said disc and said lever are substantially co-planar.

5. The invention as defined in claim 1 wherein said quiver includes a through slot, said disc being pivotally mounted in said slot so that said lever protrudes outwardly from one side of said slot, said slot having two closed ends which form pivotal abutment stop limits for said lever.

6. The invention as defined in claim 1 wherein said projection comprises at least one flange which protrudes outwardly from at least one side of said projection.

* * * * *